United States Patent
Di Giandomenico et al.

(10) Patent No.: US 12,333,036 B2
(45) Date of Patent: Jun. 17, 2025

(54) API CONSUMPTION

(71) Applicant: Salesforce, Inc., San Francisco, CA (US)

(72) Inventors: Francisco Di Giandomenico, Buenos Aires (AR); Alejandro Juan Amura, Buenos Aires (AR); Diego Rubinstein, Buenos Aires (AR); Nicolas Gaston Mouso, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 288 days.

(21) Appl. No.: 17/949,137

(22) Filed: Sep. 20, 2022

(65) Prior Publication Data
US 2023/0085639 A1  Mar. 23, 2023

Related U.S. Application Data

(60) Provisional application No. 63/246,285, filed on Sep. 20, 2021.

(51) Int. Cl.
*G06F 21/62* (2013.01)
*G06F 9/54* (2006.01)
*G06F 11/34* (2006.01)

(52) U.S. Cl.
CPC ............ *G06F 21/6218* (2013.01); *G06F 9/54* (2013.01); *G06F 11/3476* (2013.01)

(58) Field of Classification Search
CPC .... G06F 21/6218; G06F 9/54; G06F 11/3476; G06F 9/547; G06F 21/629
See application file for complete search history.

(56) References Cited

U.S. PATENT DOCUMENTS

| | | | |
|---|---|---|---|
| 9,904,560 B2 * | 2/2018 | Cooper | G06F 16/22 |
| 10,936,384 B1 * | 3/2021 | Mamidela | G06F 9/543 |
| 11,307,847 B1 * | 4/2022 | Yim | G06F 8/33 |
| 2013/0132854 A1 * | 5/2013 | Raleigh | G06F 3/0482 |
| | | | 715/738 |
| 2014/0052617 A1 * | 2/2014 | Chawla | G06Q 20/102 |
| | | | 705/39 |

* cited by examiner

*Primary Examiner* — S M A Rahman
(74) *Attorney, Agent, or Firm* — Sterne, Kessler, Goldstein & Fox. P.L.L.C.

(57) ABSTRACT

Disclosed herein are system, method, and computer program product embodiments for the design, architecture, and implementation of various aspects of an API gateway. A computer implemented method may access, by an API portal, a catalog comprising a plurality of APIs. The catalog may be configured to return a subset of the plurality of APIs based on a search. Each API at the catalog may include at least one feature comprising an API type. The method may then download one or more APIs from the plurality of APIs to the API portal. The method may further manage access to the API portal, where the access is associated with one or more users. The method may customize a layout of the API portal, where the layout includes at least one customizable feature comprising a color scheme. The method may then generate logs and metrics corresponding to each API at the API portal.

20 Claims, 12 Drawing Sheets

API CONSUMPTION

CROSS-REFERENCE TO RELATED APPLICATIONS

This application claims the benefit of U.S. Provisional Patent Application No. 63/246,285, entitled "API Consumption", and filed on Sep. 20, 2021, which is incorporated by reference herein in its entirety.

BACKGROUND

Application Programming Interface ("API") gateways/portals are a common component in modern architectures, helping organizations route their API requests, aggregate API responses, and enforce service level agreements through features like rate limiting. But an API gateway also plays an important role as a secure access point that protects an organization's APIs. Gateways point to the backend APIs and services that a service provider defines, and abstracts them into a layer that can be regulated by an API management solution.

Continual improvements are needed to API gateways in order to provide improved performance and functionality to end users and service providers alike.

BRIEF DESCRIPTION OF THE DRAWINGS

The accompanying drawings are incorporated herein and form a part of the specification.

FIG. 10 depicts an exemplary UI including elements used to provide access to an API catalog via an API portal, in accordance with embodiments.

FIG. 11 depicts an exemplary UI including elements used to manage an API portal, in accordance with embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for the design, architecture, and implementation of various aspects of an API gateway.

Modern software architectures often incorporate APIs to allow communication between two or more computer programs. If each developer or team of developers manages their own APIs, it may be difficult to keep track of API versioning and API access. It may be beneficial for a company or team of developers to have a single API gateway or portal through which to manage their APIs. The API portal may allow for simplified management since all of the APIs are accessed from the API portal. For example, API updates can easily be facilitated by simply updating the version at the API portal. Additionally, the API portal can include access protections that define which users can have access to specific APIs. An API portal also allows for aggregation of logs and metrics. The logs and metrics can be used by an API portal manager to determine the status of the APIs as well as their popularity.

Figure 1:
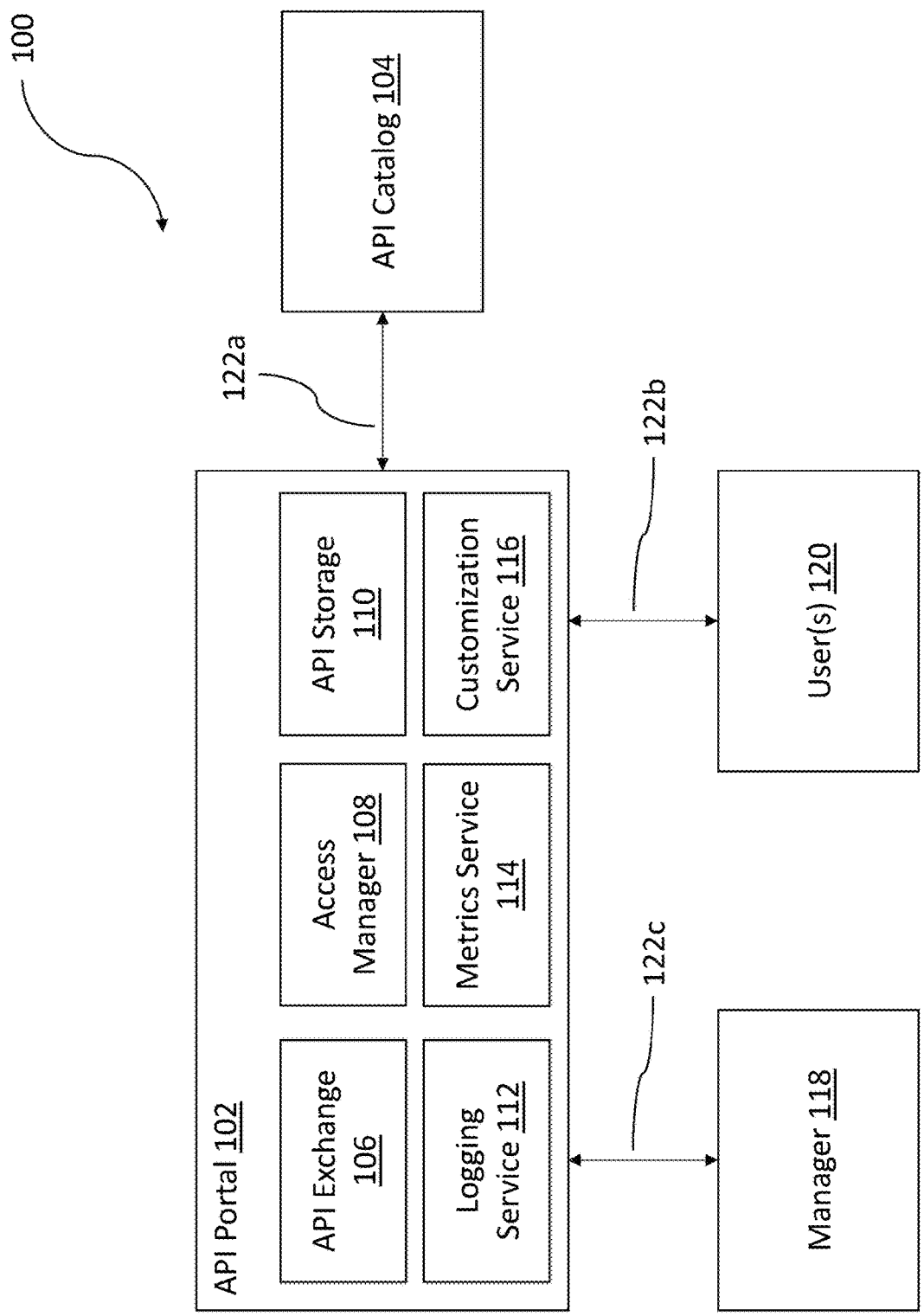
FIG. 1 is an exemplary architecture for an API portal, in accordance with embodiments.

FIG. 1 illustrates a system 100 for creating and customizing an API portal 102. System 100 can include API portal 102, an API catalog 104, a portal manager 118 and one or more users 120. API portal 102 may include an API exchange 106, an access manager 108, an API storage 110, a logging service 112, a metrics service 114, and a customization service 116.

API manager 118 can use API portal 102 to transform developer portals into personalized digital experiences that promote API products and increase engagement across an API ecosystem. API portal 102 may allow users 120 to build and operate communities around APIs for developers and partners, both inside and outside of an organization, who write applications that use the APIs.

To drive developer adoption of APIs, API portal 102 can help users 120 discover and learn how to use APIs effectively, and provide a personalized, branded experience to motivate them to work with the portal manager 118. Although users 120 may be developers interacting with API portal 102, users 120 can also be software with credentials that allow them access to API portal 102. API portal 102 can enable the creation of a personalized, connected experience for user 120 so they can interact with APIs designed, cataloged, and managed in API portal 102. An ecosystem may be capable of hosting a plurality of API portals 102.

API manager 118 may communicate with API portal 102 via network 122c. Network 122c may be wired and/or wireless (or a combination thereof), and which may include any combination of LANs, WANs, the Internet, etc. API portal 102 may authenticate API manager 118 to verify the identity of API manager 118. For example, API manager 118 may have an associated username and password that is transmitted to API portal 102 and authenticated before API manager 118 can interact with or change API portal 102.

API portal 102 can be any combination of hardware, software, and/or firmware capable of communicating with API catalog 104. API portal 102 may be capable of interfacing with multiple API catalogs 104. API portal 102 may communicate with API catalog 104 over a network 122a. Network 122a may be wired and/or wireless (or a combination thereof), and which may include any combination of LANs, WANs, the Internet, etc. In some embodiments, API portal 102 may continue to function if a connection cannot be established with API catalog 104 or the connection to API catalog 104 is severed.

API portal 102 may include an API exchange 106. API exchange 106 may be responsible for communicating between API portal 102 and API catalog 104. API exchange 106 may provide API manager's 118 login credentials to API catalog 104 so that API catalog 104 can verify that portal manager 118 has permission to access API catalog 104. API exchange 106 may also communicate with API catalog 104 in order to search for and retrieve APIs. API catalog 104 may contain one or more APIs. API catalog 104 may physically store the APIs or retrieve them from a separate device.

In one embodiment, portal manager 118 can interface with API portal 102 to search for APIs at API catalog 104. In this example, API exchange 106 may be responsible for sending the search terms to API catalog 104 and receiving any results from API catalog 104. In another embodiment, portal manager 118 may be able to use a filter to find APIs at API catalog 104 containing certain attributes. For example, portal manager 118 may only be interested in representational state transfer (REST) APIs. In this embodiment, portal manager 118 may be able to filter, via API exchange 106, the available APIs at API catalog 104 to only view REST APIs. The APIs stored at API catalog 104 may comprise additional characteristics such as a name, a version, an author, a publish date, and a last update date. Portal manager 118 may select APIs at API catalog 104 containing the filtered attributes to download to API portal 102. Downloaded APIs may be received by API exchange 106 and stored at API storage 110.

API storage 110 may be a floppy disk drive, a magnetic tape drive, a compact disk drive, an optical storage device, tape backup device, and/or any other storage device/drive. API storage 110 may store any APIs that are downloaded from API catalog 104. Portal manager 118 may be able to remove APIs stored at API storage 110. Portal manager 118 may set access permissions via access manager 108. The access permissions may define which users 120 can interact with all or a subset of the APIs at API storage 110.

User 120 may interface with API portal 102 over network 122b. Network 122b may be wired and/or wireless (or a combination thereof), and which may include any combination of LANs, WANs, the Internet, etc. Although one user 120 is depicted in FIG. 1, it should be appreciated that a plurality of users 120 may interface with API portal 102 over network 122b. User 120 may request to access one or more APIs at API storage 110. Portal manager 118 may use access manager 108 to grant or deny each user request. In another embodiment, portal manager 118 may set user 120 access permissions without receiving access requests from user 120.

User 120 may have characteristics. For example, each user 120 may have login credentials such as a username and/or password. Access manager 108 may authenticate each user 120 attempting to access API portal 102. User 120 may also have a characteristic associating them with a team or group. Access manager 108 may then set permissions for API access for the entire group of users 120. This may be beneficial where a group of users 120 are all developers on the same team and will need access to the same APIs. Although access manager 108 may set permissions for groups of users 120, access manager 108 may still be able to alter the access permissions for individual users 120 within the group. For example, a user 120 that belongs to a team with access to a certain API may have their access revoked if they are temporarily assigned to a different team. Once granted access to an API, user 120 may be able to use the API stored at API storage 110.

Portal manager 118 may also be capable of configuring the APIs stored at API storage 110. In one embodiment, each API may have an associated configuration file to define various settings for the API. For example, an API may have a configuration file that defines the paths to certain files used by the API. Portal manager 118 may be able to access and edit the configurations for each API at API portal 102.

API portal 102 may also contain a logging service 112. Loggin service 112 may generate logs relating to the operation of API portal 102. For example, logging service 112 may write a message in a log each time an API is downloaded from API catalog 104 or each time 120 access permissions are changed. Logging service 112 may also be responsible for generating logs corresponding to the APIs at API portal 102. For example, logging service 112 may generate a log each time an API encounters an error or enters a failure state. Access manager 108 may allow or disallow users to view the logs associated with APIs they have access to. Logs may be stored on a floppy disk drive, a magnetic tape drive, a compact disk drive, an optical storage device, tape backup device, and/or any other storage device/drive. Portal manager 118 may be able to access the logs generated by logging service 112. This may be beneficial so that portal manager 118 can remain aware of any issues relating to API portal 102 and any of the stored APIs.

API portal 102 may further contain metrics service 114. Metrics service 114 may generate metrics for API portal 102. Such metrics may include the total uptime for API portal 102, number of user 102 logins, and number of APIs downloaded from API catalog 104. Metrics service 114 may also be capable of generating metrics for each of the APIs stored at API storage 110. The generated metrics may include various pieces of information such as APIs average number of requests per minute, average uptime, total consumers, and a top consumer category. Portal manager 118 may allow or disallow user 120, via access manager 108, to view the metrics associated with APIs they have access to.

API portal may also contain a customization service 116. Customization service 116 may allow for the customization of a user interface at API portal 102. For example, customization service 116 may allow the color scheme of API portal 102 to be defined. Customization service 116 may also allow for branding and/or logo materials to be displayed at API portal 102. This may be advantageous in a scenario where portal manager 118 and each user 118 belongs to the same company.

Figure 2:
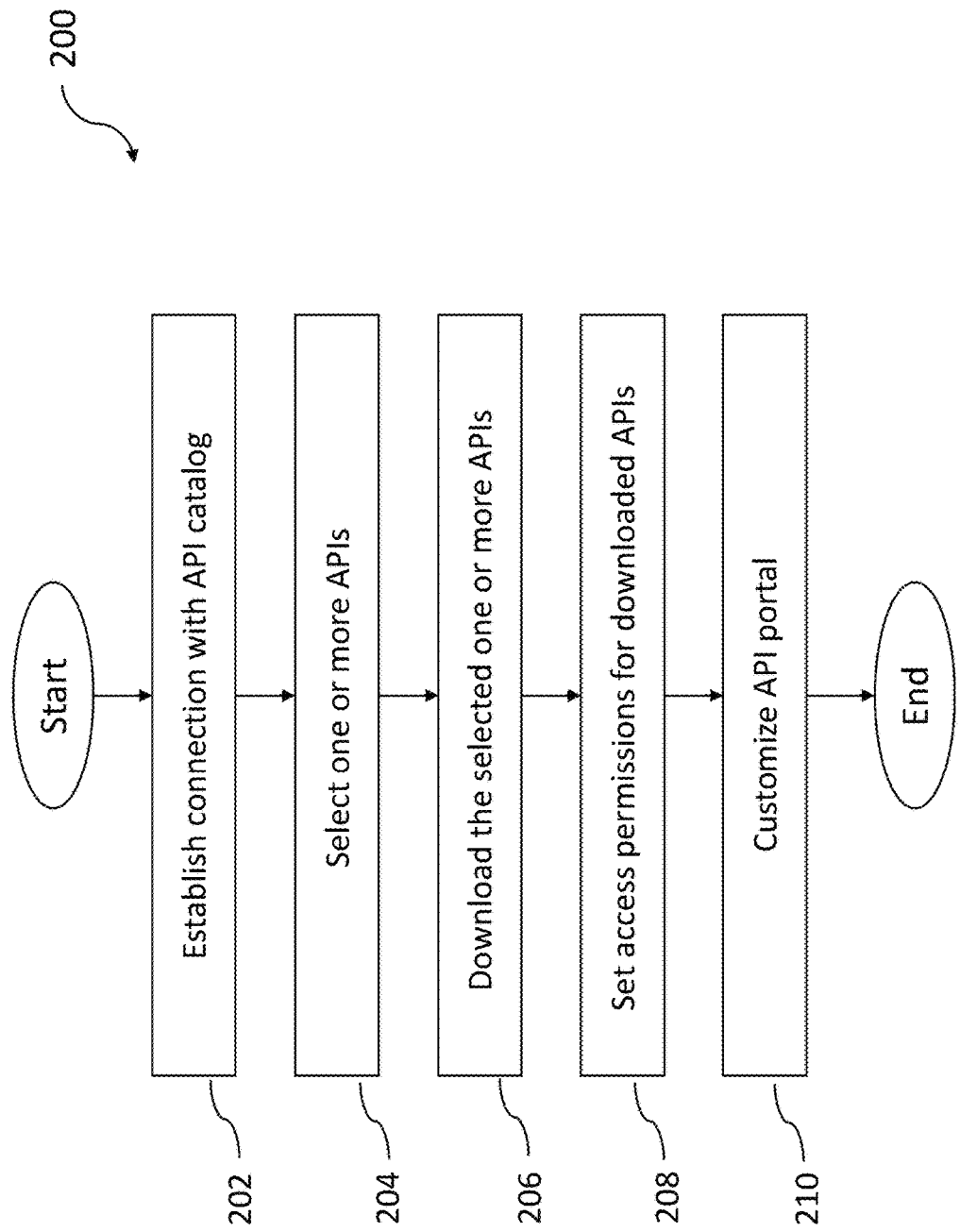
FIG. 2 is a flowchart illustrating steps by which APIs can be downloaded to an API portal, in accordance with embodiments.

FIG. 2 is a flowchart 200 illustrating steps by which APIs can be downloaded to an API portal, such as API portal 102, may be configured in accordance with embodiments.

At step 202, a connection may be established between API portal 102 and API catalog 104. In one embodiment, API portal 102 and API catalog 104 may be located on separate physical devices connected via the internet. In another embodiment, API portal 102 and API catalog 104 may be located on the same physical machine. API catalog 104 may authenticate the connection with API portal 102 before access is granted. This may be beneficial so that only certain users can browse API catalog 104.

At step 204, one or more APIs at API catalog 104 may be selected. A text search utility may be used in order to find APIs located on API catalog 104. For example, APIs may be searchable based on their name. In another embodiment, a filter utility may be used to find APIs. For example, each API may be assigned a type such as REST, simple object access protocol (SOAP), or hypertext transfer protocol (HTTP). In this embodiment, if the APIS are filtered by type REST, only REST APIs may be displayed for selection.

At step 206, one or more selected APIs are downloaded from API catalog 104 to API portal 102. The APIs may be stored at API storage 110.

At step 208, access permissions for the APIs at API portal 102 are set. The access permissions may be associated with which users 120 are able to access the APIs at API portal 102.

At step 210, API portal 102 may be customized. Customization may include setting a color scheme for the API portal 102. The color scheme may correspond to the color scheme of a company. The customization may also include including any logos and/or branding. The logos and/or branding may be associated with the company managing API portal 102.

Figure 3:
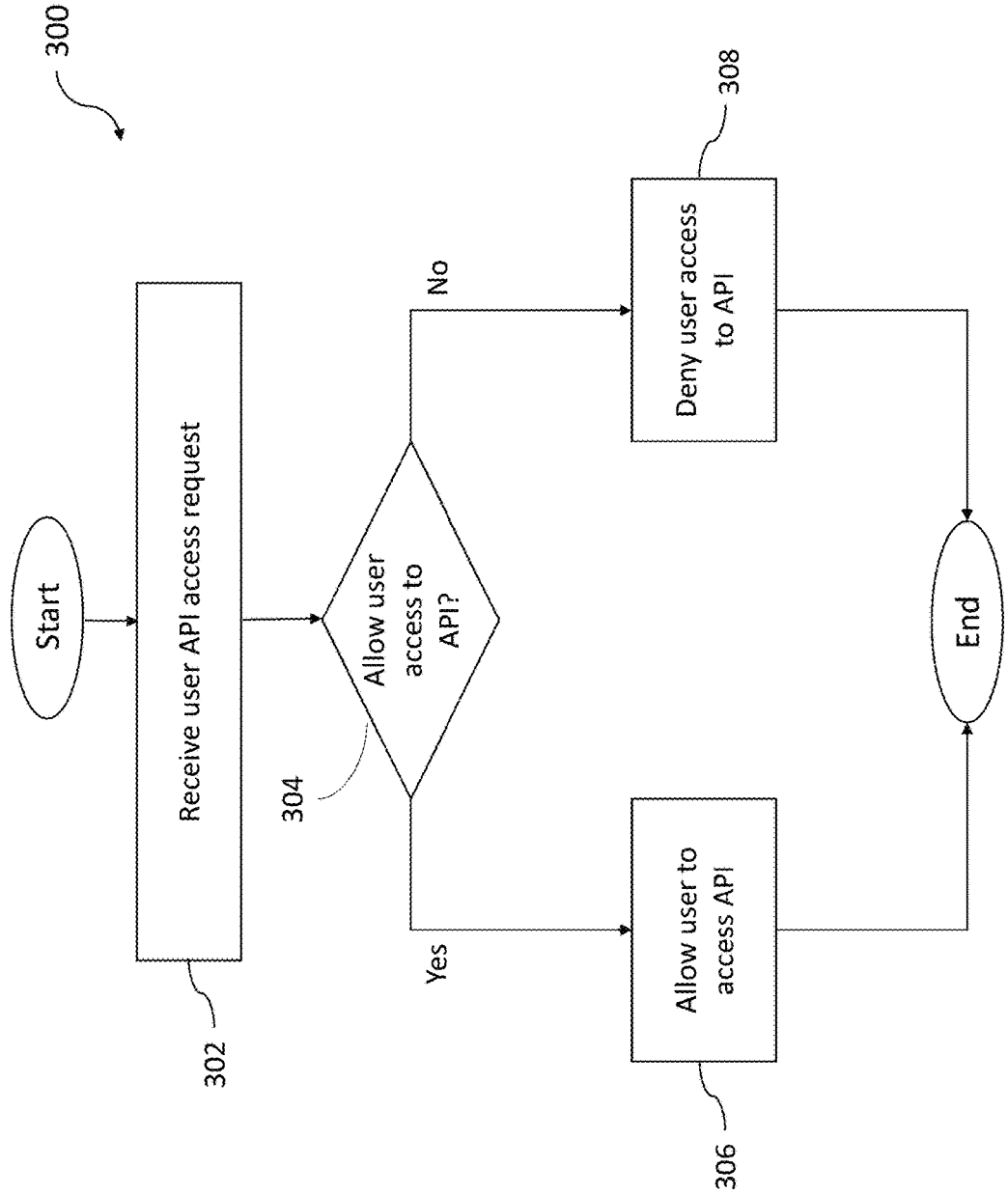
FIG. 3 is a flowchart illustrating steps by which a user is granted access to an API portal, in accordance with embodiments.

FIG. 3 is a flowchart 300 illustrating steps by which a user is granted access to an API portal, such as API portal 102, in accordance with an embodiment. Flowchart 300 depicts an exemplary implementation of step 208 in FIG. 2.

At step 302, API portal 102 may receive a request from user 120 to access APIs at API portal 102. The request may be received over an electronic network. API portal 102 may authenticate user 120 before allowing user 120 to request access to specific APIs. For example, user 120 may be assigned a username and password that API portal 102 can use to verify the identity of the user 120. Once verified, user 120 may request access to the APIs stored on API portal 102.

At step 304, a determination may be made as to whether to allow user 120 to access one or more APIs at API portal 102. In one embodiment, portal manager 118 may already have set the access permissions for user 120 and the requested API. In another embodiment, if portal manager 118 has not already set the access permissions for user 120 and the requested API, portal manager 118 may be notified of the request and respond by granting or denying access. Portal manager 118 may also set default access values. For example, portal manager 118 may set a rule that allows all users 120 to access certain APIs.

At step 306, user 120 may be granted access to the requested API at API portal 102. User 118 may access the API at API portal 102 via network 122b.

At step 308, user 118 may be denied access to API portal 102.

Figure 4:
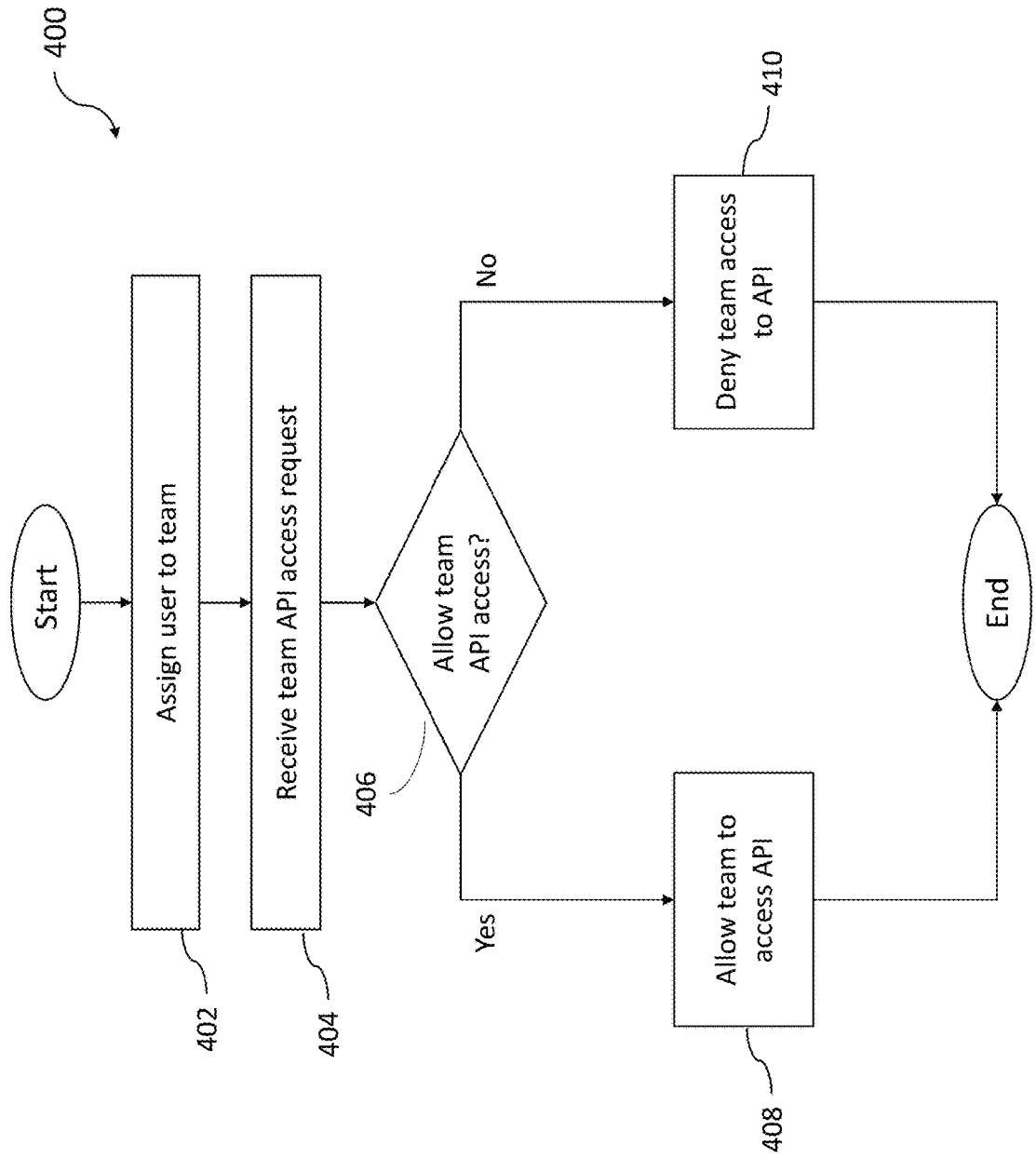
FIG. 4 is a flowchart illustrating steps by which a team of users are granted access to an API portal, in accordance with embodiments.

FIG. 4 is a flowchart 400 illustrating steps by which a team of users are granted access to an API portal, such as API portal 102, in accordance with an embodiment. Flowchart 400 depicts an exemplary implementation of step 208 in FIG. 2.

At step 402, users 120 may be assigned to a team. Teams may consist of one or more users 120. User 120 may belong to more than one team.

At step 404, API portal 102 may receive a request from a team to access one or more APIs at API portal 102. The request may be received over an electronic network.

At step 406, a determination may be made as to whether to allow the team to access API portal 100. In one embodiment, portal manager 118 may already have set the access permissions for a team of users 120 and the requested API. In another embodiment, if portal manager 118 has not already set the access permissions for a team of users 120 and the requested API, portal manager 118 may be notified of the request and respond by granting or denying access. Portal manager 118 may also set default access values. For example, portal manager 118 may set a rule that allows all users 120 to access certain APIs.

At step 408, the team may be granted access to the requested APIs at API portal 102.

At step 410, the team may be denied access to the requested APIs at API portal 102.

Figure 5:
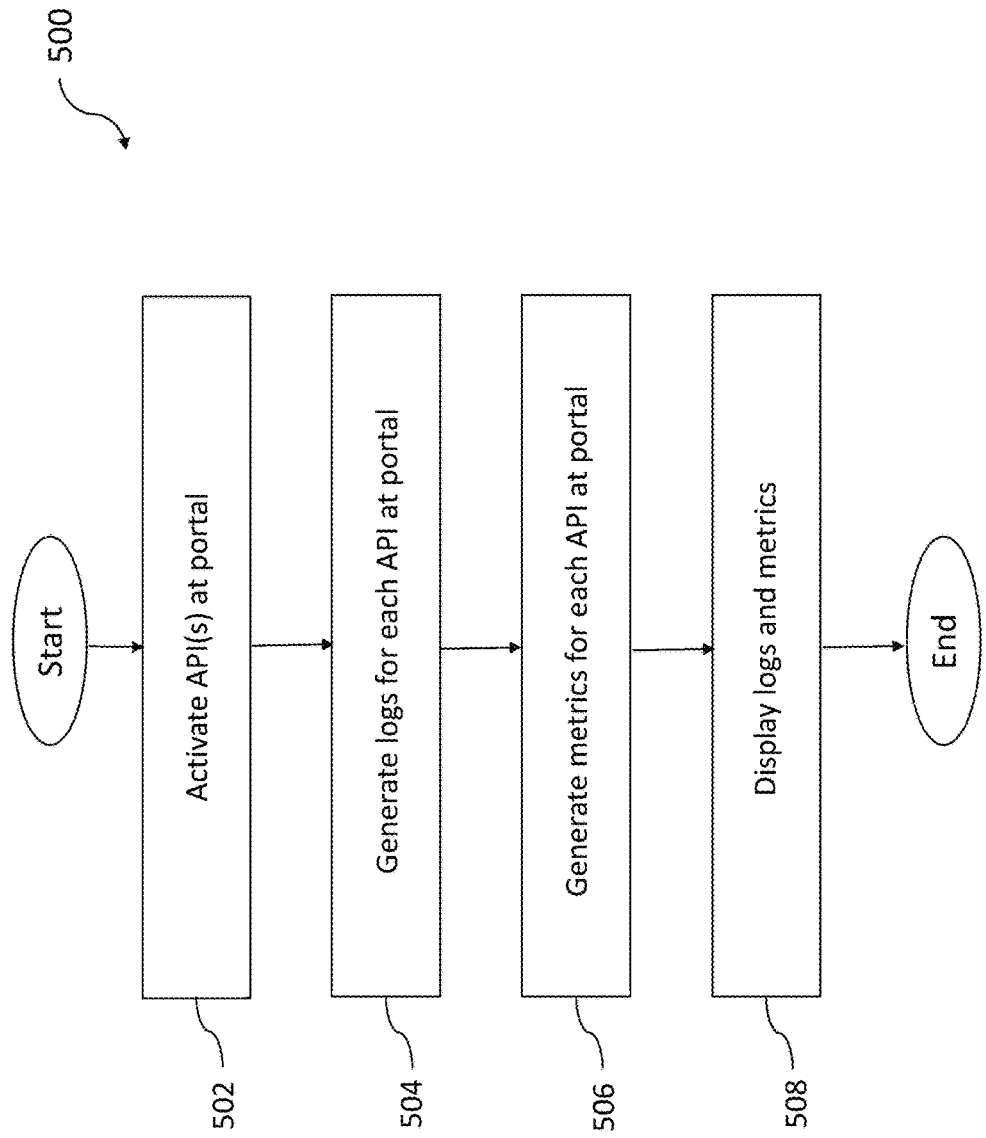
FIG. 5 is a flowchart illustrating steps by which logs and/or metrics may be generated by an API portal, in accordance with embodiments.

FIG. 5 is a flowchart 500 illustrating steps by which logs and/or metrics may be generated by an API portal, such as API portal 102, in accordance with an embodiment.

At step 502, one or more APIs may be activated at API portal 102. This may allow user 120 or teams of users 120 with access to interface with the one or more APIs.

At step 504, logs may be generated for each activated APIs at API portal 102. The generated logs may include one or more messages relating to the function of the API. In one embodiment, a log message may be generated when the API is first activated. In this embodiment, the message may contain information such as the name of the API, a statement that the API was activated, the date of the activation, and the time of the activation. In another embodiment, a log message may be generated if the API encounters an error or failure state. It may be beneficial to store error or failure messages so that portal manager 118 can become aware of possible issues and alert user 120 of the issues.

At step 506, metrics may be generated for each activated API. Metrics may include data such as APIs average number of requests per min, average uptime, total consumers, and a top consumer category, in accordance with an embodiment. It may be beneficial to generate and store metrics related to each API in order to determine the popularity of the APIs at API portal 102.

At step 508, the logs and metrics generated may be displayed. In one embodiment, only portal manger 118 may be able to access the logs and metrics. In another embodiment, portal manager 118 may grant user 120 or teams of users 120 to view the metrics associated with the APIs that they use.

Figure 6:
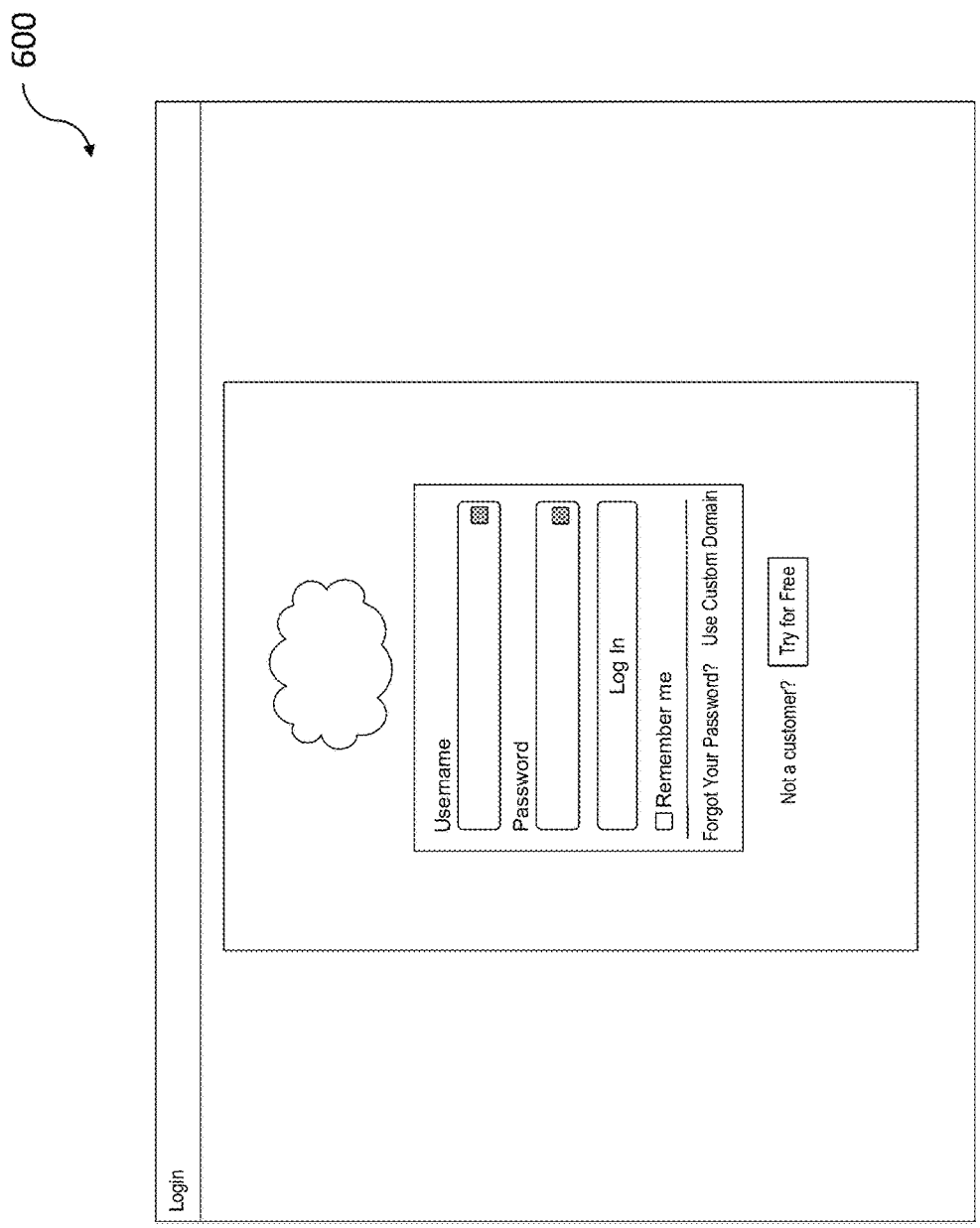
FIG. 6 depicts an exemplary user interface ("UI") including an authentication prompt, in accordance with embodiments.

FIG. 6 depicts an exemplary user interface ("UI") including an authentication prompt 600, in accordance with embodiments. Authentication prompt may be used by portal manager 118 to access API portal 102. Authentication prompt 600 may also be used by user 120 to access API portal 102. Authentication prompt 600 may allow input of a username and password. The username and password may be used by API portal 102 to authenticate the identity the party who input the username and password.

Figure 7:
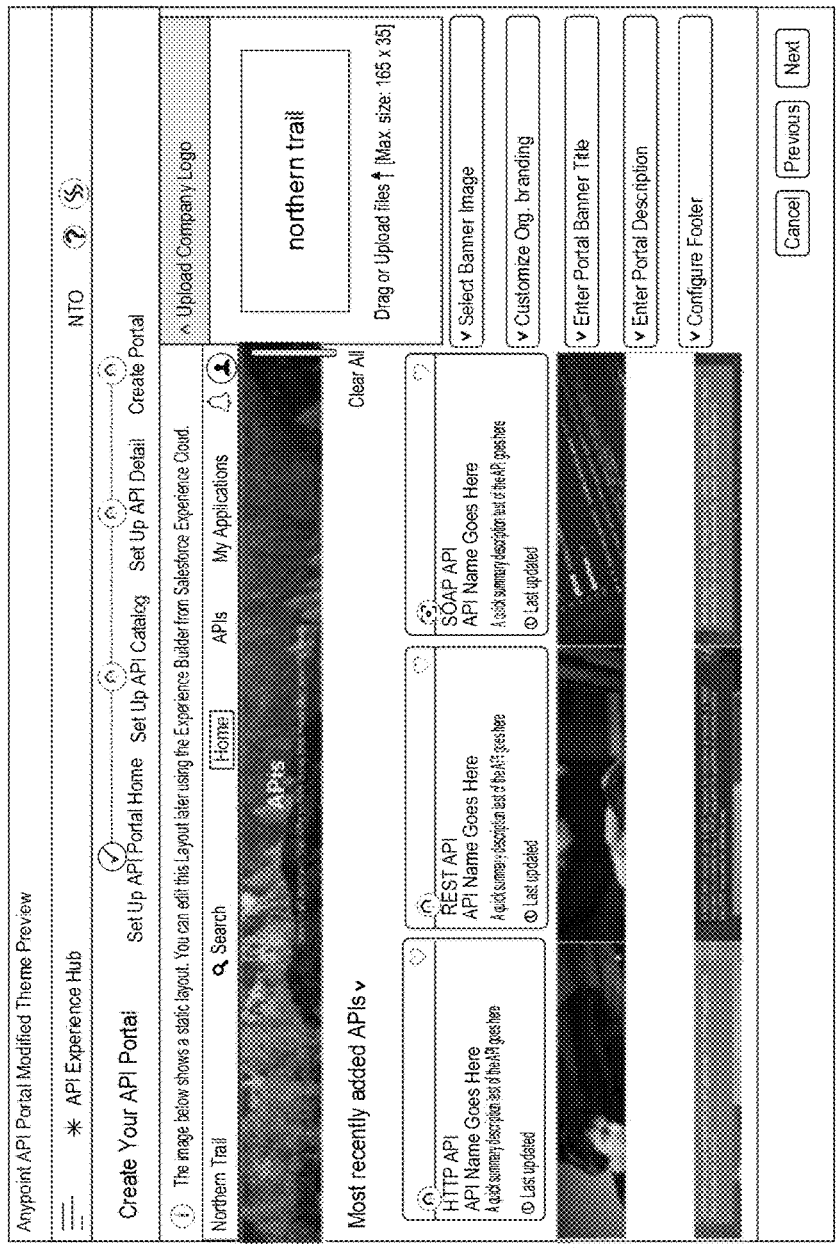
FIG. 7 depicts an exemplary UI including a first view of an API portal, in accordance with embodiments.

FIG. 7 depicts an exemplary UI including a first view of an API portal 102, in accordance with embodiments. API portal 102 may include an API portal creation page 700 may be used to create API portal 102. API portal creation page 700 may be accessed by portal manager 118.

Figure 8:
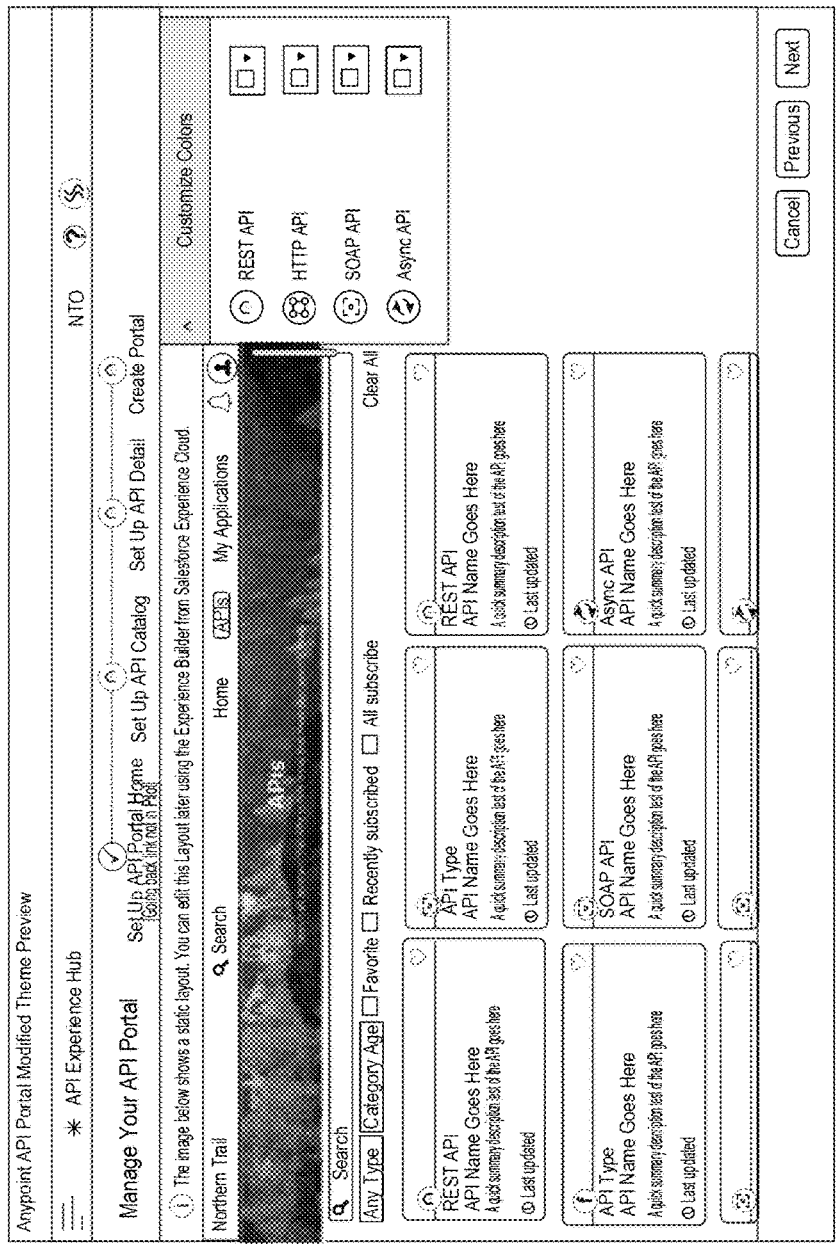
FIG. 8 depicts an exemplary UI including a first view of an API portal, in accordance with embodiments.

FIG. 8 depicts an exemplary UI including a first view of an API portal 102, in accordance with embodiments. API portal 102 may include an API portal customization page 800. API portal customization page 800 may allow portal manager 118 to view APIs that are downloaded to API portal 102. API portal customization page 800 may also allow portal manager 118 to customize the presentation of APIs at API portal 102. For example, portal manager 118 may choose a display color for each API at API portal 102.

Figure 9:
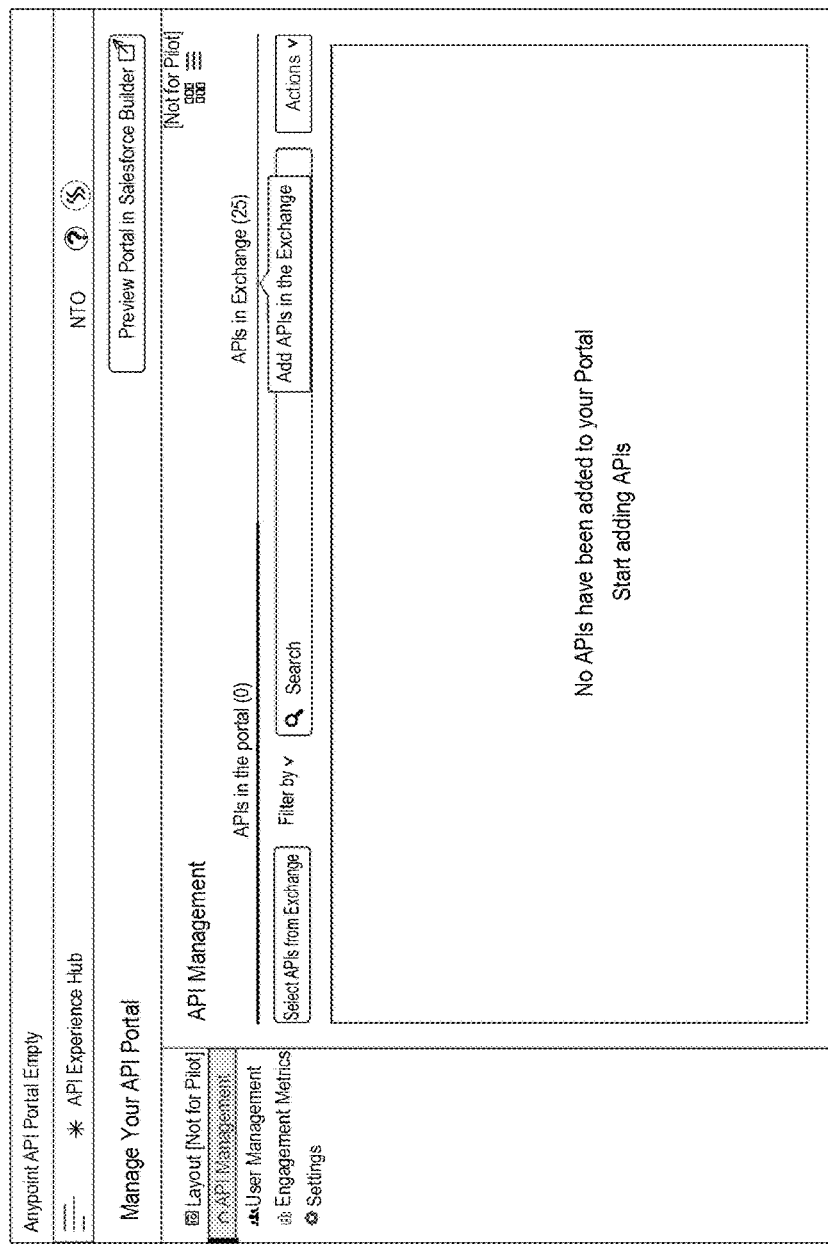
FIG. 9 depicts an exemplary UI including a first view of an API portal, in accordance with embodiments.

FIG. 9 depicts an exemplary UI including a first view of an API portal 102, in accordance with embodiments. API portal 102 may include an API management page 900. API management page may allow portal manager 118 to view the APIs that have been downloaded to API portal 102. In one embodiment, there may be no APIs downloaded to API portal 102.

Figure 10:
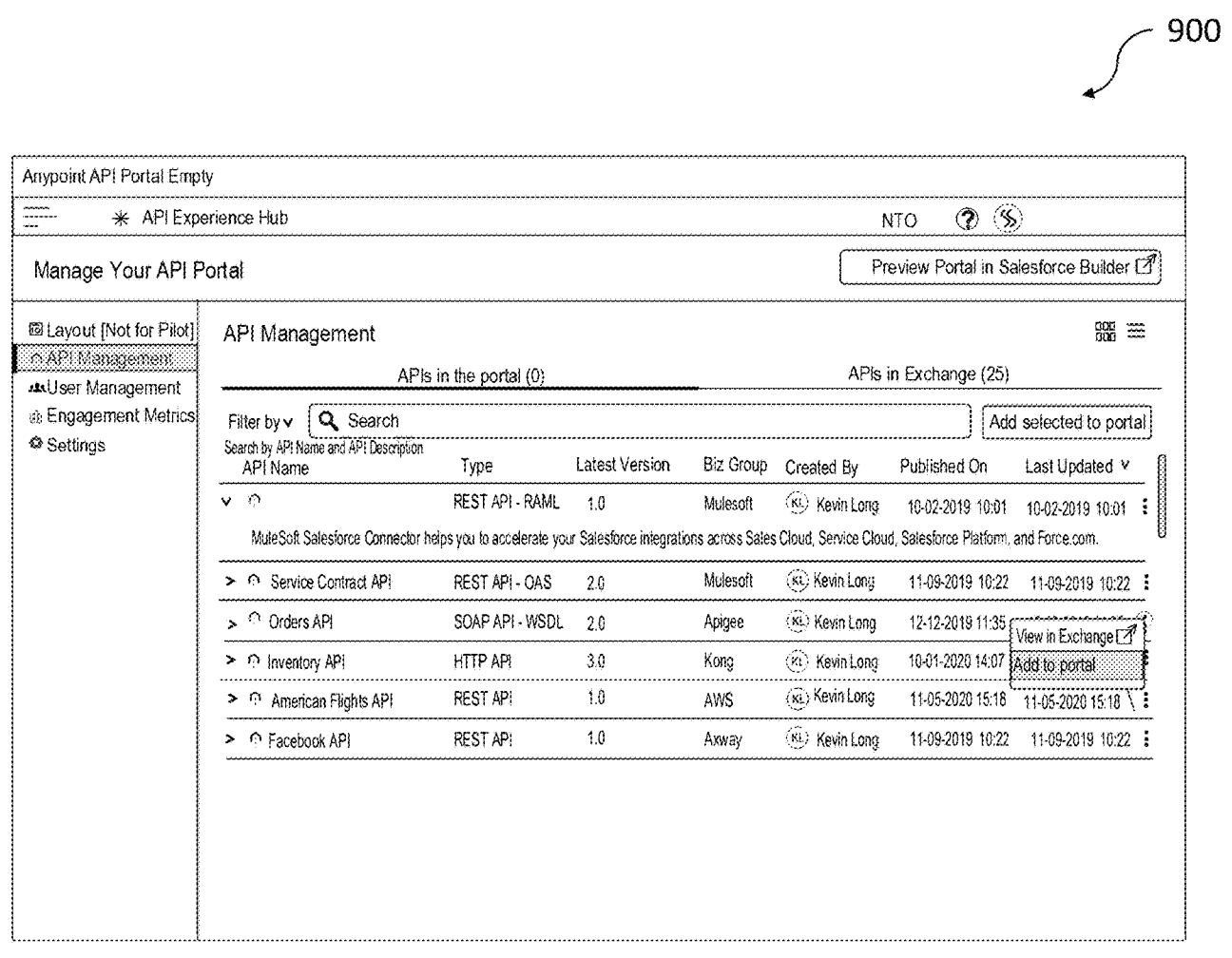

FIG. 10 depicts an exemplary UI including elements used to provide access to an API catalog 104 via an API portal 102, in accordance with embodiments. API management page 900 may allow portal manager 118 to view APIs at API catalog 104. API management page 900 may allow portal manager 118 to select APIs at API catalog 104 and download them to API portal 102.

Figure 11:
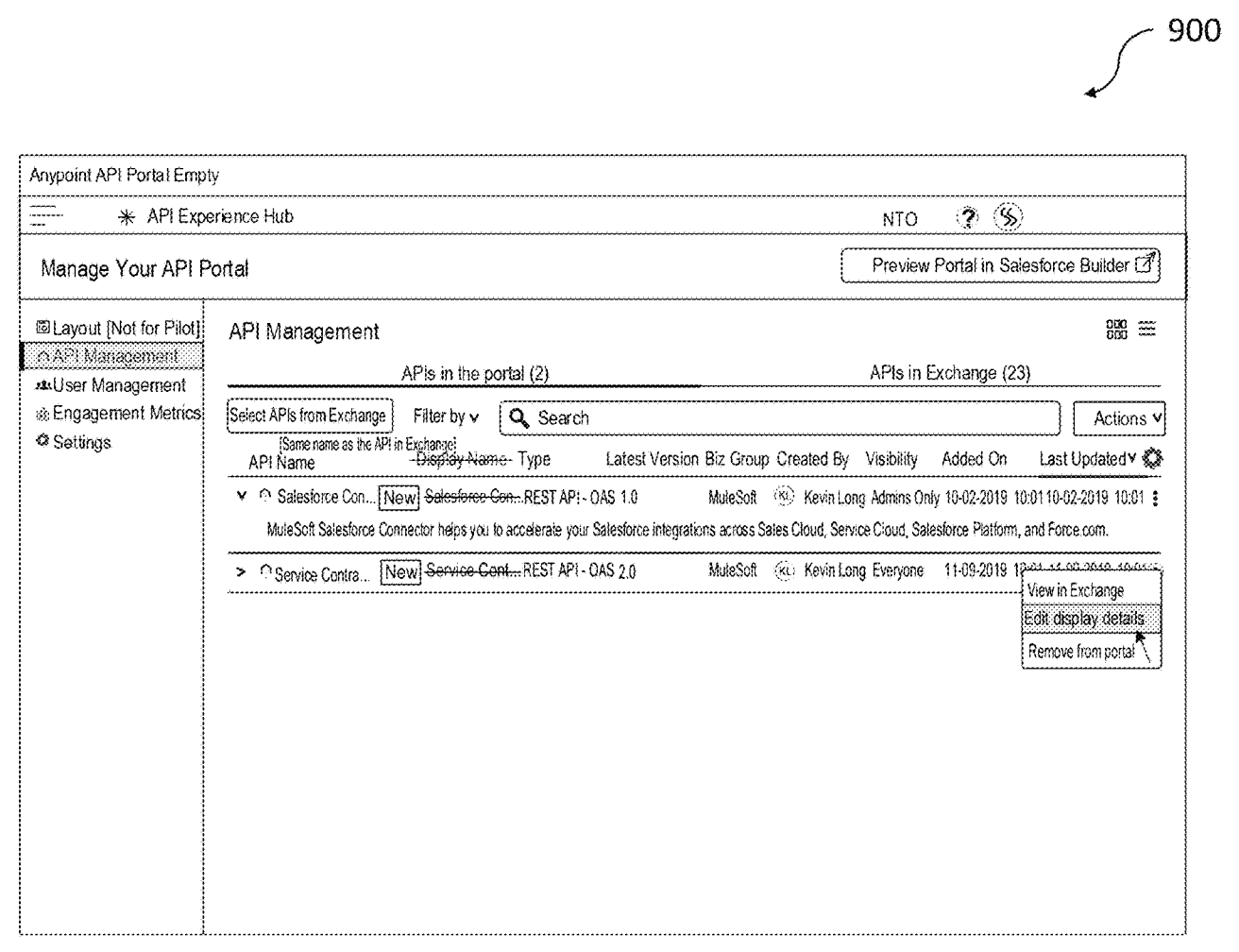

FIG. 11 depicts an exemplary UI including elements used to manage an API portal 102, in accordance with embodiments. API management page 900 may allow portal manager 118 to view the downloaded APIs at API portal 102. API management page 900 may allow portal manager 118 to edit the display details for each downloaded API. API management page 900 may also allow portal manager 118 to remove APIs from API portal 102.

Figure 12:
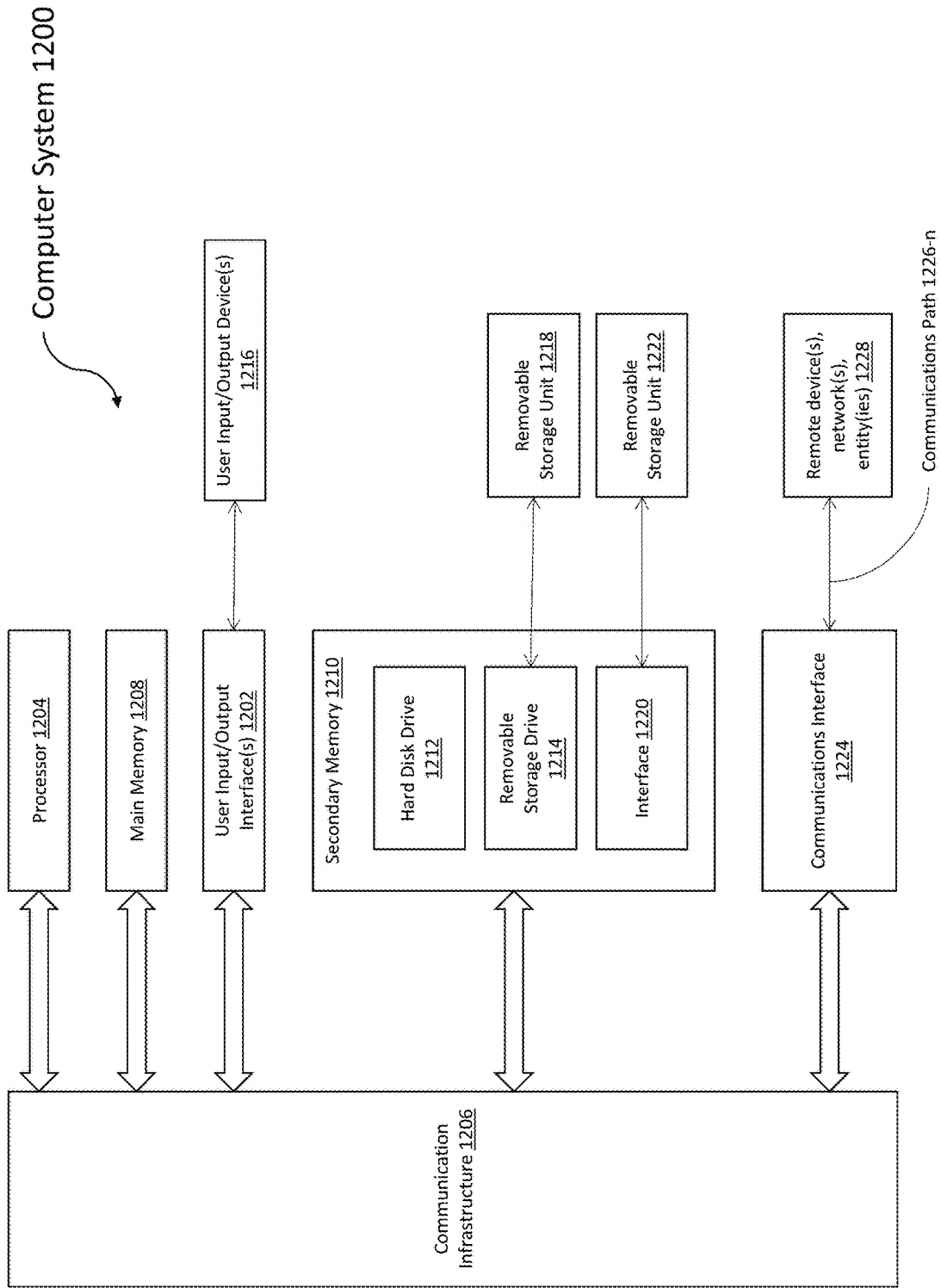
FIG. 12 is an example computer system useful for implementing various embodiments.

Various embodiments may be implemented, for example, using one or more well-known computer systems, such as computer system 1200 shown in FIG. 12. One or more computer systems 1200 may be used, for example, to implement any of the embodiments discussed herein, as well as combinations and sub-combinations thereof.

Computer system 1200 may include one or more processors (also called central processing units, or CPUs), such as a processor 1204. Processor 1204 may be connected to a communication infrastructure or bus 1206.

Computer system 1200 may also include customer input/output device(s) 1203, such as monitors, keyboards, pointing devices, etc., which may communicate with communication infrastructure 1206 through customer input/output interface(s) 1202.

One or more of processors 1204 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 may also include a main or primary memory 1208, such as random access memory (RAM). Main memory 1208 may include one or more levels of cache. Main memory 1208 may have stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 may include a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 may read from and/or write to removable storage unit 1218.

Secondary memory 1210 may include other means, devices, components, instrumentalities or other approaches for allowing computer programs and/or other instructions and/or data to be accessed by computer system 1200. Such means, devices, components, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 may enable computer system 1200 to communicate and interact with any combination of external devices, external networks, external entities, etc. (individually and collectively referenced by reference number 1228). For example, communication interface 1224 may allow computer system 1200 to communicate with external or remote devices 1228 over communications path 1226, which may be wired and/or wireless (or a combination thereof), and which may include any combination of LANs, WANs, the Internet, etc. Control logic and/or data may be transmitted to and from computer system 1200 via communication path 1226.

Computer system 1200 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1200 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1200 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 12. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   searching, by one or more computing devices, a catalog comprising a plurality of Application Programming Interfaces (APIs) having a corresponding type;
   receiving, from the catalog, an API from among the plurality of APIs in response to the searching and based on filtered according to the corresponding type of the API;
   downloading, by the one or more computing devices, the API to an API portal responsive to a return of the API;
   setting, by the one or more computing devices, access permissions for the API;
   generating, by the one or more computing devices, a log corresponding to the API at the API portal;
   generating, by the one or more computing devices, metrics corresponding to the API at the API portal;
   presenting, by the one or more computing devices, a user interface (UI) at the API portal comprising the API, the log, and the metrics;
   receiving a request to access the API portal from a user; and
   authenticating the user based on the access permissions, wherein the access permissions for the API define select users to view the log and the metrics.

2. The method of claim 1, further comprising controlling the access permissions for the API and the UI at the API portal.

3. The method of claim 1, wherein the plurality of APIs comprise one or more characteristics and the UI is further configured to present the one or more characteristics.

4. The method of claim 3, further comprising filtering and sorting the plurality of APIs at the catalog based on at least one of the characteristics.

5. The method of claim 1, wherein the metrics comprise a number of requests per day, an average uptime, and a total number of downloads.

6. The method of claim 1, wherein the log includes a message indicating a time the API was downloaded.

7. The method of claim 1, further comprising customizing the UI based on at least one customizable feature comprising a color scheme.

8. A system for Application Programming Interface consumption, comprising:
   a catalog comprising a plurality of APIs, wherein the catalog is configured to return an API of the plurality of APIs responsive to a search, the plurality of APIs having a corresponding type,
   an API portal in electronic communication with the catalog, the API portal configured to:
   search the catalog for an API;
   receive, from the catalog, the API from among the plurality of APIs in response to the searching and based on filtered according to the corresponding type of the API;
   download the API from the catalog responsive to the return of the API;
   set access permissions for the API
   generate a log corresponding to the API at the API portal;
   generate metrics corresponding to the API at the API portal;
   present a user interface (UI) comprising the API, the log, and the metrics;
   receive a request to access the API portal from a user; and
   authenticate the user based on the access permissions, wherein the access permissions for the API define select users to view the log and metrics.

9. The system of claim 8, wherein the API portal is further configured to control the access permissions for the API and the UI at the API portal.

10. The system of claim 8, wherein the plurality of APIs comprise one or more characteristics and the UI is further configured to present the one or more characteristics.

11. The system of claim 10, wherein the API portal is further configured to filter and sort the plurality of APIs at the catalog based on at least one of the characteristics.

12. The system of claim 8, wherein the metrics comprise a number of requests per day, an average uptime, and a total number of downloads.

13. The system of claim 8, wherein the log includes a message indicating a time the API was downloaded.

14. The system of claim 8, wherein the API portal is further configured to customize the UI based on at least one customizable feature comprising a color scheme.

15. A non-transitory computer-readable medium having instructions stored thereon that, when executed by at least one computing device, cause the at least one computing device to perform operations comprising:
   searching a catalog comprising a plurality of Application Programming Interfaces (APIs) having a corresponding type;
   receiving, from the catalog, an API from among the plurality of APIs in response to the searching and based on filtered according to the corresponding type of the API;
   downloading the API to an API portal responsive to a return of the API;
   setting, by the at least one computing device, access permissions for the API;
   generating a log corresponding to the API at the API portal;
   generating metrics corresponding to the API at the API portal; presenting a user interface (UI) at the API portal comprising the API, the log, and the metrics;
   receiving a request to access the API portal from a user; and
   authenticating the user based on the access permissions, wherein the access permissions for the API define select users to view the log and the metrics.

16. The non-transitory computer-readable medium of claim 15, wherein the plurality of APIs comprises one or more characteristics and the UI is further configured to present the one or more characteristics.

17. The non-transitory computer-readable medium of claim 16, the operations further comprising filtering and sorting the plurality of APIs at the catalog based on at least one of the characteristics.

18. The non-transitory computer-readable medium of claim 15, wherein the metrics comprise a number of requests per day, an average uptime, and a total number of downloads.

19. The non-transitory computer-readable medium of claim 15, wherein the log includes a message indicating a time the API was downloaded.

20. The non-transitory computer-readable medium of claim 15, the operations further comprising customizing the UI based on at least one customizable feature comprising a color scheme.

* * * * *

UNITED STATES PATENT AND TRADEMARK OFFICE
CERTIFICATE OF CORRECTION

PATENT NO. : 12,333,036 B2
APPLICATION NO. : 17/949137
DATED : June 17, 2025
INVENTOR(S) : Di Giandomenico et al.

Page 1 of 1

It is certified that error appears in the above-identified patent and that said Letters Patent is hereby corrected as shown below:

On the Title Page

Column 2, in "Primary Examiner", Line 1, delete "S M" and insert -- SM --, therefor.

Column 2, Item (74), in "Attorney, Agent, or Firm", Line 2, delete "Fox." and insert -- Fox --, therefor.

In the Claims

In Column 10, Claim 8, Line 47, delete "API" and insert -- API; --, therefor.

In Column 11, Claim 15, Lines 26-27, delete "presenting a user interface (UI) at the API portal comprising the API, the log, and the metrics;" and insert the same at Line 27, as a new sub-point.

Signed and Sealed this
Sixteenth Day of September, 2025

Coke Morgan Stewart
*Acting Director of the United States Patent and Trademark Office*